(12) United States Patent
Seo et al.

(10) Patent No.: US 11,120,242 B2
(45) Date of Patent: Sep. 14, 2021

(54) MOVING FINGERPRINT RECOGNITION METHOD AND APPARATUS USING DISPLAY

(71) Applicant: LG Display Co., Ltd., Seoul (KR)

(72) Inventors: Woong-Jin Seo, Gimpo-si (KR); Tae-Yong Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 46 days.

(21) Appl. No.: 16/544,017

(22) Filed: Aug. 19, 2019

(65) Prior Publication Data
US 2020/0097698 A1 Mar. 26, 2020

(30) Foreign Application Priority Data

Sep. 21, 2018 (KR) .................. 10-2018-0114009

(51) Int. Cl.
| | |
|---|---|
| *G06F 3/041* | (2006.01) |
| *G06K 9/00* | (2006.01) |
| *G06F 3/0488* | (2013.01) |
| *G06F 3/042* | (2006.01) |

(52) U.S. Cl.
CPC ....... *G06K 9/00013* (2013.01); *G06F 3/0421* (2013.01); *G06F 3/04883* (2013.01); *G06F 3/041661* (2019.05); *G06K 9/00067* (2013.01)

(58) Field of Classification Search
CPC .............. G06F 3/041661; G06F 3/0421; G06F 3/04883; G06K 9/00013; G06K 9/00067
See application file for complete search history.

(56) References Cited

U.S. PATENT DOCUMENTS

2017/0123566 A1* 5/2017 Noguchi ........... G06F 3/041661

\* cited by examiner

*Primary Examiner* — Abdul-Samad A Adediran
(74) *Attorney, Agent, or Firm* — Polsinelli PC

(57) ABSTRACT

Moving fingerprint recognition method and apparatus using display is provided. A moving fingerprint recognition method includes driving a pixel array, a touch sensor and a fingerprint sensor located in a display area of a display, continuously sensing touch positions of a finger touching and moving on a surface of the display through the fingerprint sensor, calculating touch coordinates of each frame from an output of the touch sensor during a time corresponding to a plurality of frames, and storing the touch coordinates in a memory, continuously sensing a fingerprint of the touched and moved finger through the fingerprint sensor, acquiring fingerprint data of each frame from an output of the fingerprint sensor during the time corresponding to the plurality of frames, and storing the fingerprint data in the memory, and acquiring fingerprint recognition data of one frame by up-scaling, summing and synthesizing the fingerprint data of the plurality of frames.

20 Claims, 14 Drawing Sheets

| 80 | | | | | | | | | | |
|---|---|---|---|---|---|---|---|---|---|---|
|0.1|0.3|0.7|0.9|1.0|1.0|1.0|0.9|0.7|0.3|0.1|
|0.3|1.0|2.0|2.7|3.0|3.0|3.0|2.7|2.0|1.0|0.3|
|0.6|1.7|3.3|4.4|5.0|5.1|5.3|5.0|3.9|2.0|0.7|
|0.6|1.7|3.3|4.4|5.0|5.3|6.0|6.1|5.0|2.7|0.9|
|0.3|1.0|2.0|2.7|3.0|3.7|5.0|6.0|5.3|3.0|1.0|
|0.2|0.7|1.3|1.8|2.0|2.8|4.3|5.7|5.2|3.0|1.0|
|0.3|1.0|2.0|2.7|3.0|3.7|5.0|6.0|5.3|3.0|1.0|
|0.6|1.7|3.3|4.4|5.0|5.3|6.0|6.1|5.0|2.7|0.9|
|0.6|1.7|3.3|4.4|5.0|5.1|5.3|5.0|3.9|2.0|0.7|
|0.3|1.0|2.0|2.7|3.0|3.0|3.0|2.7|2.0|1.0|0.3|
|0.1|0.3|0.7|0.9|1.0|1.0|1.0|0.9|0.7|0.3|0.1|

| 82 | | | | | | | | | | |
|---|---|---|---|---|---|---|---|---|---|---|
|0.0|0.3|0.8|1.2|1.3|1.3|1.3|1.2|0.8|0.3|0.0|
|0.3|1.3|2.8|3.8|4.3|4.3|4.3|3.8|2.8|1.3|0.3|
|0.7|2.3|4.8|6.5|7.3|7.5|7.8|7.3|5.7|2.8|0.8|
|0.7|2.3|4.8|6.5|7.3|7.8|8.8|9.0|7.3|3.8|1.2|
|0.3|1.3|2.8|3.8|4.3|5.3|7.3|8.8|7.8|4.3|1.3|
|0.2|0.8|1.8|2.5|2.8|4.0|6.3|8.3|7.7|4.3|1.3|
|0.3|1.3|2.8|3.8|4.3|5.3|7.3|8.8|7.8|4.3|1.3|
|0.7|2.3|4.8|6.5|7.3|7.8|8.8|9.0|7.3|3.8|1.2|
|0.7|2.3|4.8|6.5|7.3|7.5|7.8|7.3|5.7|2.8|0.8|
|0.3|1.3|2.8|3.8|4.3|4.3|4.3|3.8|2.8|1.3|0.3|
|0.0|0.3|0.8|1.2|1.3|1.3|1.3|1.2|0.8|0.3|0.0|

86

84

MOVING FINGERPRINT RECOGNITION METHOD AND APPARATUS USING DISPLAY

CROSS REFERENCE TO RELATED APPLICATION

This application claims the benefit of Korean Patent Application No. 10-2018-0114009, filed on Sep. 21, 2018, which is hereby incorporated by reference in its entirety.

BACKGROUND

Field of the Disclosure

The present disclosure relates to a display device, and more particularly, to a moving fingerprint recognition method and apparatus using a display, which are capable of sensing and recognizing a fingerprint that moves on a display surface through a display.

Description of the Background

An electronic apparatus using a display, such as a smartphone or a tablet personal computer (PC), provides a fingerprint recognition function for unlocking or user authentication in Internet banking.

To this end, a fingerprint sensor mounted in an electronic apparatus may be located at a bezel surrounding a display area or a rear surface of a case or may be attached to one surface of a display panel.

However, since the conventional fingerprint sensor is provided on an electronic apparatus or a display separately from the display, the size, thickness, weight, and manufacturing cost of the electronic apparatus or the display may increase.

Meanwhile, technology for building a fingerprint sensor in a display panel has been proposed. However, when accuracy of the fingerprint sensor increases in order to secure fingerprint recognition performance, a pixel aperture ratio may be reduced and luminance may be lowered, thereby deteriorating display performance. When accuracy of the fingerprint sensor decreases in order to prevent display performance from deteriorating, fingerprint recognition performance may deteriorate and thus fingerprint identification may be impossible.

SUMMARY

Accordingly, the present disclosure is directed to a moving fingerprint recognition method and apparatus that substantially obviate one or more problems due to limitations and disadvantages of the prior art.

The present disclosure provides a moving fingerprint recognition method and apparatus capable of sensing and recognizing a fingerprint moving on a display surface through a display without deterioration of display performance and fingerprint recognition performance.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, a moving fingerprint recognition apparatus includes a display including a pixel array, a touch sensor and a fingerprint sensor located in a display area, a display driver, a touch operation circuit, a fingerprint operation circuit, and a controller.

The touch operation circuit is configured to drive the touch sensor, to continuously sense touch positions of a finger touching and moving on a surface of the display through the fingerprint sensor, to calculate touch coordinates of each frame from an output of the touch sensor during a time corresponding to a plurality of frames, and to store the touch coordinates in a memory.

The fingerprint operation circuit is configured to drive the fingerprint sensor, to continuously sense a fingerprint of the finger touching and moving on the surface of the display through the fingerprint sensor, to acquire fingerprint data of each frame from an output of the fingerprint sensor during the time corresponding to the plurality of frames, and to store the fingerprint data in the memory.

The controller is configured to control operation of the display driver, the touch operation circuit, the fingerprint operation circuit and the memory.

The fingerprint operation circuit receives the touch coordinates and fingerprint data of the plurality of frames from the memory and acquires fingerprint recognition data of one frame by up-scaling, summing and synthesizing the fingerprint data of the plurality of frames, under control of the controller.

The touch coordinates of the plurality of frames may have coordinate values differing between frames, and the fingerprint data of the plurality of frames may have sensing information differing between frames.

The fingerprint operation circuit may receive touch coordinates from the touch operation circuit for each frame, determine a fingerprint sensing area having a certain size based on the touch coordinates and including all fingerprint data of a reference value or more from the output of the fingerprint sensor for each frame, and extract and store fingerprint data of the determined fingerprint sensing area in the memory.

The fingerprint operation circuit may up-scale the fingerprint data of the plurality of frames for each frame, align the up-scaled fingerprint data in a synthesis area using the touch coordinates of each frame, and acquire the fingerprint recognition data by summing and averaging the fingerprint data of the plurality of frames aligned in the synthesis area according to position.

The fingerprint operation circuit may perform stretching operation with respect to fingerprint data to have a target range, and further perform at least one of a sharpness process of applying a sharpness mask to the fingerprint data subjected to stretching operation and a contrast improvement process of applying a gamma curve having a set shape.

The fingerprint operation circuit may use the remaining number of a result of dividing the touch coordinates of each frame by a ratio of resolution of the touch sensor to resolution of the fingerprint sensor, as a reference position used to align the up-scaled fingerprint data in the synthesis area.

The resolution of the fingerprint data of each frame acquired from the fingerprint sensor may be lower than resolution of the fingerprint recognition data.

The fingerprint sensor may include light sensors distributed in the pixel array to sense the amount of light emitted from the pixel array and reflected by the fingerprint.

Each of the light sensors may be disposed every pixel or every plurality of pixels.

Each of the light sensors may be disposed every two pixels, every four pixels, every eight pixels or every nine pixels.

According to another aspect of the present disclosure, a moving fingerprint recognition method includes driving a pixel array, a touch sensor and a fingerprint sensor located in a display area of a display, continuously sensing touch positions of a finger touching and moving on a surface of the display through the fingerprint sensor, calculating touch coordinates of each frame from an output of the touch sensor during a time corresponding to a plurality of frames, and storing the touch coordinates in a memory, continuously sensing a fingerprint of the touched and moved finger through the fingerprint sensor, acquiring fingerprint data of each frame from an output of the fingerprint sensor during the time corresponding to the plurality of frames, and storing the fingerprint data in the memory, and receiving the touch coordinates and fingerprint data of the plurality of frames from the memory, and acquiring fingerprint recognition data of one frame by up-scaling, summing and synthesizing the fingerprint data of the plurality of frames.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure.

In the drawings:

FIGS. 7A and 7B are schematic views showing fingerprint data of a plurality of frames having different touch coordinates according to an aspect of the present disclosure;

DETAILED DESCRIPTION

Figure 1A:
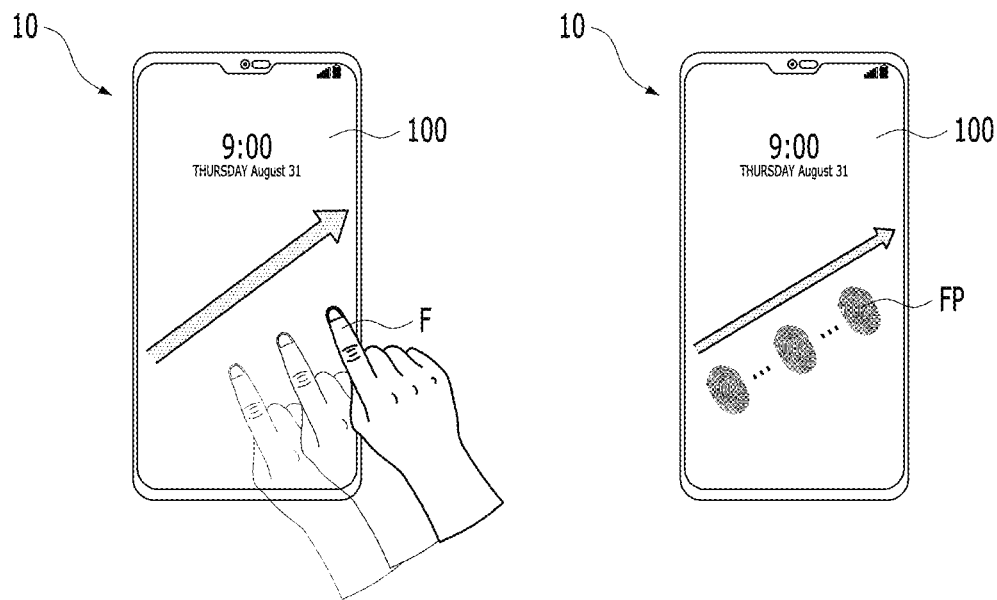
FIGS. 1A and 1B are views schematically showing the concept of moving fingerprint recognition technology using a display according to an aspect of the present disclosure.
Figure 1B:
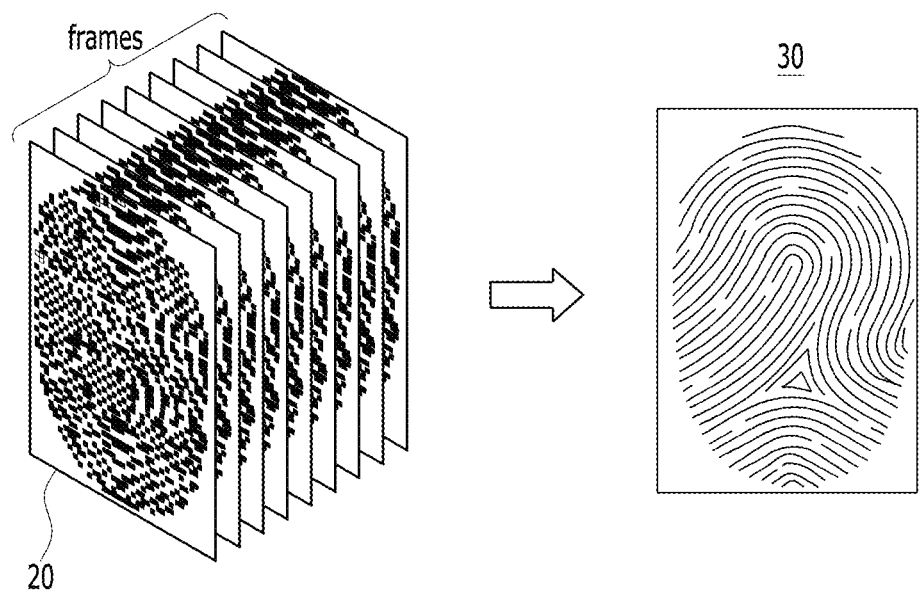

FIGS. 1A and 1B are views schematically showing the concept of moving fingerprint recognition technology using a display according to an aspect of the present disclosure.

An electronic apparatus capable of recognizing a moving fingerprint according to an aspect, that is, a moving fingerprint recognition apparatus, may be any one of various types of electronic apparatuses including a display 100, such as a smartphone, a tablet PC or a wearable apparatus. The display 100 may be any one of various types of displays, such as an organic light emitting diode (OLED) display, a liquid crystal display (LCD) and a micro-LED display.

The display 100 may provide a touch sensing function and a fingerprint sensing function along with a display function. The display 100 provides a display function through a display area composed of a pixel array. The display 100 provides a touch sensing function through a touch sensor located in a display area of a panel or using some electrodes of the pixel array as touch electrodes. The display 100 provides a fingerprint sensing function through a fingerprint sensor built in the display area of the panel. The touch sensor may use any one of various touch sensing methods and the fingerprint sensor may use any one of various fingerprint sensing methods. The display 100 may continuously sense a fingerprint along with moving touch positions when the finger moves while touching a display surface.

Referring to FIG. 1A, when fingerprint authentication of a user is required as in slide unlocking operation, the moving fingerprint recognition apparatus 10 turns on the screen of the display 100 and performs fingerprint recognition operation and the finger F of the user moves while touching the surface of the display 100. At this time, the touch sensor and the fingerprint sensor built in the display 100 continuously sense and output the moving touch positions and the fingerprint FP. The moving fingerprint recognition apparatus 10 may acquire and store touch coordinates and fingerprint data from the result of sensing the display 100 for each frame, thereby storing the touch coordinates and the fingerprint data 20 of a plurality of frames in a memory.

Referring to FIG. 1B, the moving fingerprint recognition apparatus 10 may acquire fingerprint recognition data 30 having relatively high resolution and accuracy, by up-scaling, aligning and summing the stored fingerprint data 20 of the plurality of frames. The moving fingerprint recognition apparatus 10 may store the fingerprint recognition data 30 in the memory or compare the fingerprint recognition data 30 with reference data stored in the memory to perform fingerprint authentication.

Figure 2:
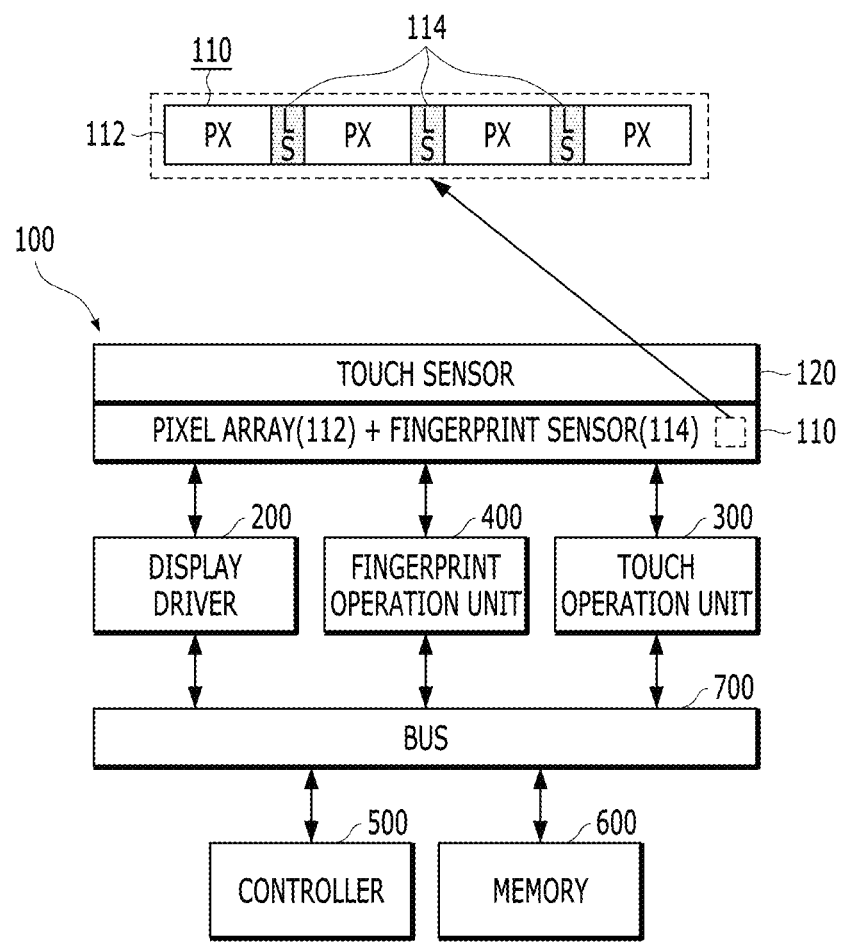
FIG. 2 is a schematic diagram showing the configuration of a moving fingerprint recognition apparatus using a display according to an aspect of the present disclosure.
Figure 3:
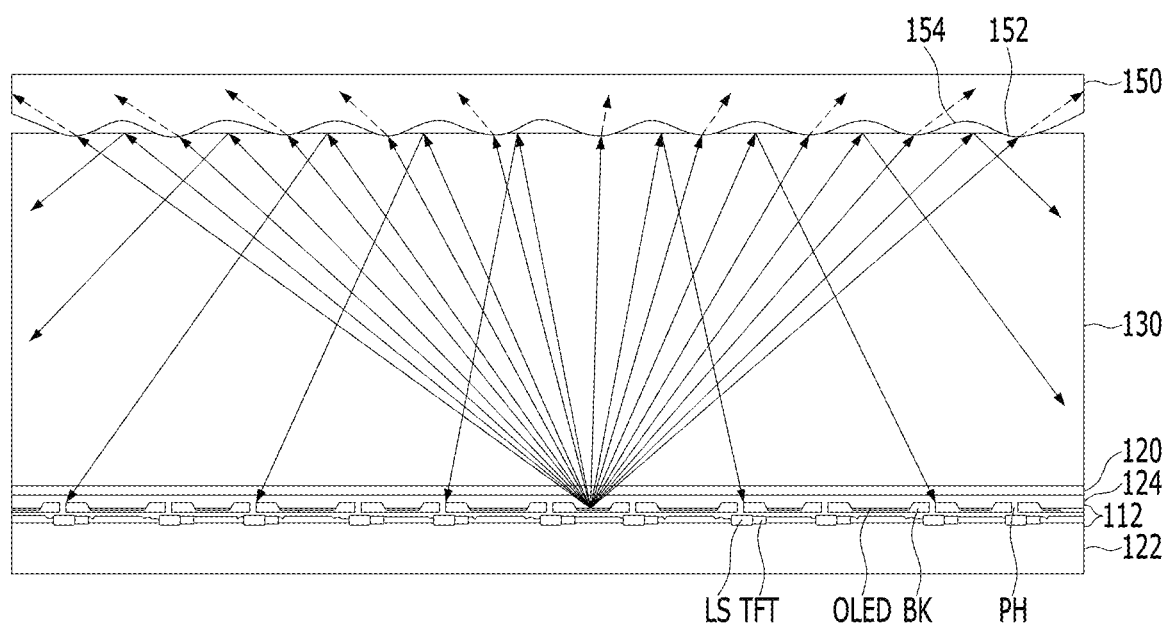
FIG. 3 is a schematic cross-sectional view of fingerprint sensing operation of an OLED display including a fingerprint sensor built therein according to an aspect of the present disclosure.

FIG. 2 is a schematic diagram showing the configuration of a moving fingerprint recognition apparatus using a display according to an aspect of the present disclosure, and FIG. 3 is a view showing a moving fingerprint recognition process according to an aspect of the present disclosure.

Referring to FIG. 2, the moving fingerprint recognition apparatus 10 according to the aspect may include a display 100, a display driver 200, a touch operation circuit 300, a fingerprint operation circuit 400, a controller 500, and a memory 600. The display driver 200, the touch operation circuit 300, the fingerprint operation circuit 400, the controller 500 and the memory 600 may be connected to one another through a bus 700 to transmit and receive data.

The display 100 may include a panel 110 including a pixel array 112 and a fingerprint sensor 114 built in a display area of the panel 110 and a touch sensor 120 located on the panel 110 or built in the panel 100. FIG. 2 shows the touch sensor 120 located on the panel 110. The display 100 may be any one of various types of displays such as an OLED display and an LCD.

The controller 500 is any one of various processors such as a central processing circuit (CPU), an application processor (AP) and a communication processor (CP) and may control overall operation of all elements of the moving fingerprint recognition apparatus 10, that is, the electronic apparatus including the display 100.

The controller 500 may control the display driver 200, the touch operation circuit 300, the fingerprint operation circuit 400 and the memory 600 through the bus 800 and operate these elements in a fingerprint recognition mode. The controller 500 supplies image data to the display driver 200. The controller 500 may receive the touch coordinates from the touch operation circuit 300 and perform a command corresponding to the touch coordinates. The controller 500 may receive fingerprint recognition data from the fingerprint operation circuit 400, perform fingerprint authentication, and perform a command such as unlocking when fingerprint authentication succeeds.

The panel 110 includes the pixel array 112 composed of a plurality of pixels PX and a fingerprint sensor 114 built in the pixel array 112. The pixel array 112 is driven by the display driver 200 to display an image. The fingerprint sensor 114 is driven by the fingerprint operation circuit 400 to sense the fingerprint and to output the result of sensing to the fingerprint operation circuit 400.

The fingerprint sensor 114 includes a plurality of light sensors LS distributed in the pixel array 112 to sense light reflected by the fingerprint, and may sense the fingerprint using a photoelectric transformation method. The light sensors LS of the fingerprint sensor 114 are driven by the fingerprint operation circuit 400, use light emitted from the pixel array 112, sense differently reflected lights according to ridges and valleys of the fingerprint located on the surface of the display 100 and output the result of sensing to the fingerprint operation circuit 400. Each light sensor LS of the fingerprint sensor 114 may be disposed in every pixel PX or every plurality of pixels PX.

The touch sensor 120 is driven by the touch operation circuit 300 to sense touch and to output the result of sensing to the touch operation circuit 300. For example, the touch sensor 120 senses capacitance change according to touch of the user using the touch electrodes and outputs a sensing signal to the operation circuit 300.

The display driver 200 drives the pixel array 112 of the panel 110 under control of the controller 500. The display driver 200 may include a gate driver for gate lines of the pixel array 112, a data driver for driving data lines of the pixel array 112, and a timing controller for controlling the gate driver and the data driver and performing image processing such as power consumption reduction or image quality correction.

The touch operation circuit 300 drives the touch sensor 120 under control of the controller 500, signal-processes the output of the touch sensor 120 to calculate touch coordinates, and outputs the touch coordinates to the controller 500.

Under control of the controller 500, in the fingerprint recognition mode, while the finger moves while touching, the touch operation circuit 300 acquires the touch coordinates of each frame from the output of the touch sensor 120 and stores the touch coordinates in the memory 600. The touch operation circuit 300 may further supply the touch coordinates of each frame to the fingerprint operation circuit 400. By touch movement of the finger, the touch coordinates of the plurality of frames calculated by the touch operation circuit 400 have different coordinate values.

Under control of the controller 500, in the fingerprint recognition mode, the fingerprint operation circuit 400 drives the fingerprint sensor 114, signal-processes the output of the fingerprint sensor 113, which has sensed the moving fingerprint of the finger, acquires finger data of each frame and stores the acquired fingerprint data in the memory 600. The fingerprint operation circuit 400 may extract the fingerprint data of a fingerprint sensing area having a certain size based on the touch coordinates of each frame received from the touch operation circuit 300 and store the fingerprint data in the memory 600 as the fingerprint data of each frame. By touch movement of the finger, the fingerprint data of the plurality of frames acquired by the fingerprint operation circuit 400 may have different information.

When storage of the touch coordinates and the fingerprint data of the plurality of frames is completed, the fingerprint operation circuit 400 receives the touch coordinates and the fingerprint data of the plurality of frames from the memory 600, under control of the controller 500. The fingerprint operation circuit 400 may acquire fingerprint recognition data with high resolution and accuracy, by up-scaling the fingerprint data of the plurality of frames and aligning and summing the up-scaled fingerprint coordinates using the touch coordinates. The fingerprint operation circuit 400 may further perform a sharpness process and a contrast improvement process with respect to the fingerprint recognition data, thereby increasing sharpness of the fingerprint recognition data. The fingerprint operation circuit 400 may store the acquired fingerprint recognition data in the memory 600 or output the acquired fingerprint recognition data to the controller 500.

The controller 500 may compare the fingerprint recognition data received from the fingerprint operation circuit 400 with the fingerprint storage data received from the memory 600, thereby performing fingerprint authentication.

FIG. 3 is a view schematically showing fingerprint sensing operation of a display according to an aspect of the present disclosure. For example, an OLED panel is used.

Referring to FIG. 3, the OLED panel according to one aspect may include a pixel array 112 located on a backplane 122 and including light sensors LS of a fingerprint sensor built in the pixel array 112, a sealing layer 124 located on the pixel array 112, a touch sensor 120 located on the sealing layer 124, and a cover glass 130 located on the touch sensor 120.

Each of the plurality of subpixels configuring the pixel array 112 includes an OLED element and a pixel circuit for driving the OLED element. A TFT array including TFTs of the pixel circuit is located on the backplane 122 and an OLED array including OLED elements is located on the TFT array. Each OLED element may be located in an emission area provided by an opening of a bank insulating film BK located on the TFT array. A color filter overlapping the OLED elements may be further located in the emission area and a black matrix may be further located in a non-emission area, in which the bank insulating film BK is located, or the bank insulating film BK may serve as a black matrix.

Each of the plurality of light sensors LS configuring the fingerprint sensor may be located in the non-emission area adjacent to the TFTs and may be composed of a photodiode, a phototransistor, etc. The light sensors LS are located below the bank insulating film BK in the non-emission area to receive light reflected from the fingerprint through a pin hole PH provided in the bank insulating film BK. Each light sensor LS may be disposed every subpixel or every plurality of subpixels or may be disposed every pixel or every plurality of pixels.

The light sensors LS may use light emitted from the pixel array 112 as a light source, sense light reflected from different points of the fingerprint 150 in contact with the cover glass 130, and output sensing signals having different levels according to the amount of reflected light.

Referring to FIG. 3, it can be seen that, in the fingerprint 150 of the finger in contact with the cover glass 130, the amount of light reflected from the ridge 152 in contact with the surface of the cover glass 130 and the amount of light reflected from the valley 154 spaced apart from the surface of the cover glass 130 are different. Each light sensor LS corresponding to each sensor pixel of the fingerprint sensor 114 may sense the amount of light reflected from the ridge 152 or the valley 154 at different points of the fingerprint and thus output sensing signals indicating the ridge 152 or the valley 154.

Accordingly, the fingerprint operation circuit 400 may convert the sensing signal of each of the light sensors LS of the fingerprint sensor 114 into data, combine the data in a matrix, and calculate the fingerprint data in the form of an image.

In one aspect of the present disclosure, since the fingerprint sensor is configured integrally with the pixel array of the display and the pixel array is used as a light source, a separate fingerprint sensor is not necessary, thereby reducing the size, thickness, weight and manufacturing cost of the display and the electronic apparatus using the same.

Figure 4:
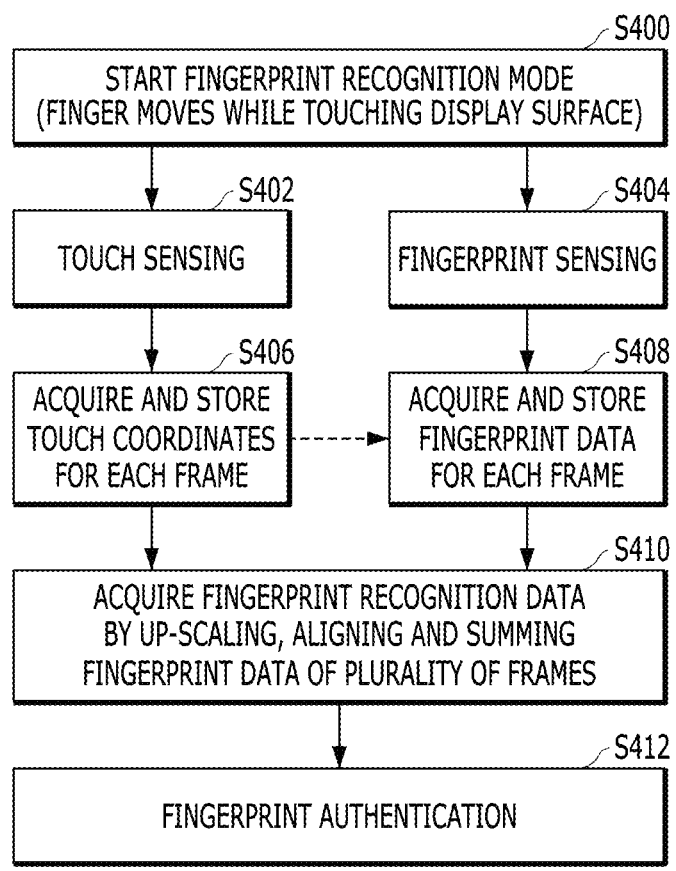
FIG. 4 is a flowchart illustrating a moving fingerprint recognition method using a display according to an aspect of the present disclosure.
Figure 5A:
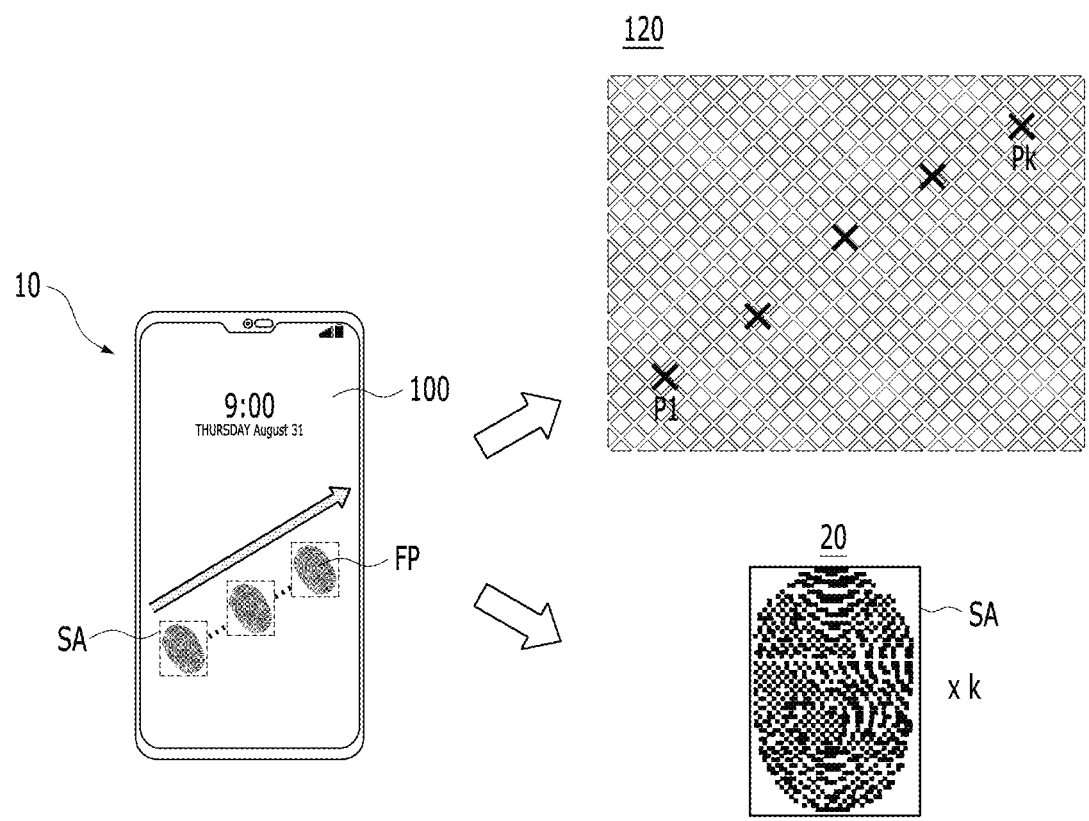
FIGS. 5A and 5B are views showing a moving fingerprint recognition process according to an aspect of the present disclosure.
Figure 5B:
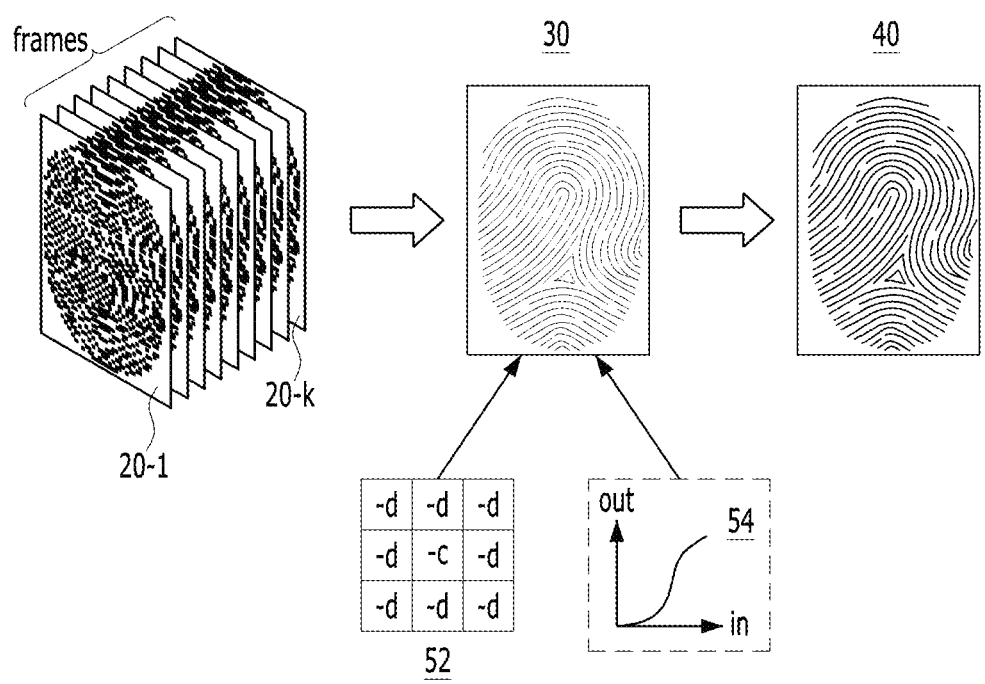

FIG. 4 is a flowchart illustrating a moving fingerprint recognition method using a display according to an aspect of the present disclosure, and FIGS. 5A and 5B are views showing a moving fingerprint recognition process according to an aspect of the present disclosure. The moving fingerprint recognition method shown in FIGS. 4, 5A and 5B will be described with reference to the fingerprint recognition apparatus shown in FIG. 2.

When fingerprint authentication is necessary, the controller 500 starts the fingerprint recognition mode and turns on the screen of the display 100 or maintains the ON state (S400). The user performs sliding operation for moving a finger while touching the surface of the display 100 for fingerprint sensing.

While the finger moves while touching the surface of the display 100, the touch sensor 120 continuously senses moving touch positions and outputs the result of sensing (S402), and the fingerprint sensor 114 built in the display 100 continuously senses the moving fingerprint and outputs the result of sensing (S404).

The touch operation circuit 300 signal-processes the output of the touch sensor 120 to acquire touch coordinates of each frame and stores the acquired touch coordinates of each frame in the memory 600 (S406). As shown in FIG. 5A, while the finger touches and moves on the touch sensor 120, the touch operation circuit 300 acquires and stores the touch coordinates of the plurality of frames indicating different touch positions P1 to Pk from the output of the touch sensor 120.

The fingerprint operation circuit 400 signal-processes the output of the fingerprint sensor 114, acquires the fingerprint data 20 of each frame in a matrix, and stores the fingerprint data 20 in the memory 600 (S408).

The fingerprint operation circuit 400 may determine a fingerprint sensing area SA having a certain size from the output of the fingerprint sensor 114 and extract and store the fingerprint data of the fingerprint sensing area SA in the memory 600. The fingerprint operation circuit 400 may receive different touch coordinates of the frames from the touch operation circuit 300 and define a rectangular area having a certain size including all fingerprint data having a reference value or more based on the touch coordinates as a fingerprint sensing area SA. Meanwhile, the fingerprint operation circuit 400 may analyze the output of the fingerprint sensor 114 and define a rectangular area having a certain size including all fingerprint data having a reference value or more as a fingerprint sensing area SA. The fingerprint operation circuit 400 may extract the fingerprint data 20 included in the fingerprint sensing area SA from the output of the fingerprint sensor 114 and store the fingerprint data 20-1 to 20-$k$ of a plurality of frames during the time corresponding to the plurality of frames.

Since the sizes of the fingerprint sensing areas AS of the frames are the same but the positions of the sensors for sensing the fingerprint of the fingerprint sensor 114, that is, the positions of the fingerprint sensing areas SA, are different due to the moving fingerprint, the fingerprint data 20-1 to 20-$k$ of the plurality of frames have different information.

The touch operation circuit 300 and the fingerprint operation circuit 400 store the touch coordinates and the fingerprint data 20-1 to 20-$k$ of the plurality of frames in the memory 600 and then the fingerprint operation circuit 400 receives the touch coordinates and the fingerprint data 20-1 to 20-$k$ of the plurality of frames from the memory 600. The fingerprint operation circuit 400 up-scales the fingerprint data 20-1 to 20-$k$ of the plurality of frames for each frame (S410). The fingerprint operation circuit 400 aligns the up-scaled fingerprint data 20-1 to 20-$k$ of the plurality of frames at the reference position of each frame based on the touch coordinates of each frame (S410). The aligned fingerprint data 20-1 to 20-$k$ of the plurality of frames overlap as shown in FIG. 5B. The fingerprint operation circuit 400 calculates the fingerprint recognition data 30 of one frame, by summing the fingerprint data 20-1 to 20-$k$ of the plurality of frames for each overlapping position (S410).

For example, the fingerprint operation circuit 400 may calculate the fingerprint recognition data 30 of one frame having the average value of the plurality of data for each position, by summing data of each overlapping position and dividing the summed value of each position by the number k of frames.

In addition, the fingerprint operation circuit 400 may enhance discrimination of data by performing data stretching using a maximum value max and a minimum value min of the generated fingerprint recognition data 30.

In addition, the fingerprint operation circuit 400 may apply a sharpness mask 52 shown in FIG. 5B to the data-stretched fingerprint image to perform the sharpness process or apply an S-shaped gamma curve 54 shown in FIG. 5B to perform a contrast improvement process, thereby acquiring the fingerprint recognition data 40 with improved sharpness. Therefore, the fingerprint operation circuit 400 may acquire the fingerprint recognition data 40 with high resolution and accuracy. The fingerprint operation circuit 400 may supply the acquired fingerprint recognition data to the controller 50 or store the acquired fingerprint recognition data in the memory 600 as user fingerprint data under control of the controller 500.

The controller 500 may perform fingerprint authentication by comparing the fingerprint recognition image 40 received from the fingerprint operation circuit 400 with the fingerprint storage data received from the memory 600, and perform a command such as unlocking when fingerprint authentication succeeds (S412).

Since the fingerprint sensor of the display 100 according to the aspect senses the fingerprint FP moving on the surface of the display 100 at different positions for each frame as shown in FIG. 5A, the fingerprint data 20-1 to 20-$k$ of the plurality of frames having different touch coordinates may have different sensing information. Therefore, the moving fingerprint recognition apparatus 10 may acquire the fingerprint recognition data 30 with high resolution and accuracy, by up-scaling, summing and synthesizing the fingerprint data 20-1 to 20-$k$ of the plurality of frames having different sensing information. Accordingly, it is possible to improve fingerprint recognition performance.

For example, the moving fingerprint recognition apparatus 10 may acquire the fingerprint data 20 of 30 frames having different sensor positions through the fingerprint sensor when the finger slides on the surface of the display 100 for 0.5 seconds and acquire the fingerprint data 20 of 12 frames when the finger slides for 0.2 seconds. As the time when the finger slides on the surface of the display 100 increases, the number of frames of the fingerprint data 20 having different sensing information increases. Therefore, it is possible to improve accuracy of the fingerprint recognition data 30 obtained by summing and synthesizing the fingerprint data.

In addition, the moving fingerprint recognition apparatus 10 further performs a post-processing procedure of at least one of a sharpness process and a contrast improvement process with respect to the fingerprint recognition data 30 to acquire the fingerprint recognition data 40 with improved sharpness, thereby improving discrimination of the fingerprint recognition data 40.

Accordingly, the moving fingerprint recognition apparatus 10 according to the aspect of the present disclosure can reduce resolution and accuracy (pixels per inch (ppi)) of the fingerprint sensor built in the display 100 without deteriorating fingerprint recognition performance. As a result, by minimizing deterioration of the pixel aperture ratio due to the fingerprint sensor, it is possible to prevent display performance deterioration and to reduce the manufacturing costs of the display 100 and the moving fingerprint recognition apparatus 10.

Figure 6:
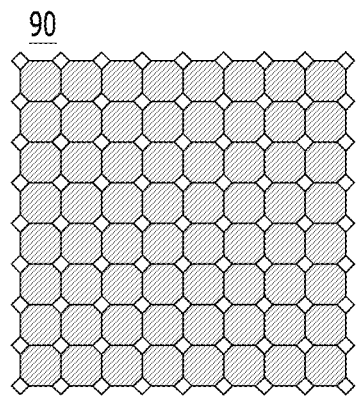
FIG. 6 is a schematic view showing various light sensor arrangement structures according to accuracy of a fingerprint sensor built in a pixel array according to an aspect of the present disclosure.
Figure 6:
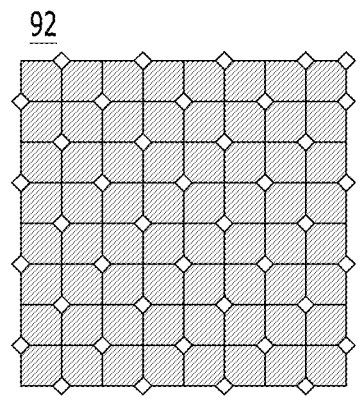
Figure 6:
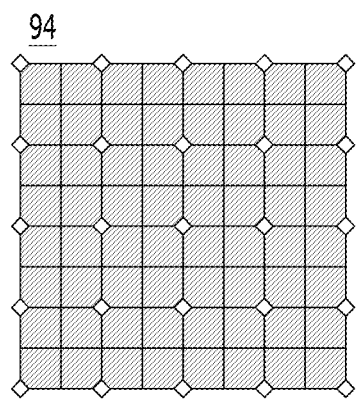
Figure 6:
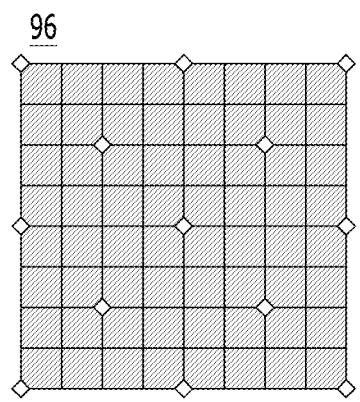
Figure 6:
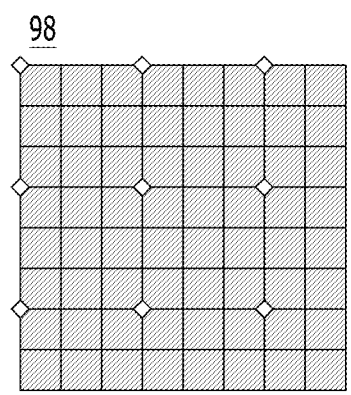

FIG. 6 is a view showing various light sensor arrangement structures according to accuracy of a fingerprint sensor built in a pixel array according to an aspect of the present disclosure.

Referring to FIG. 6, in the fingerprint sensor 90 according to a first aspect, pixels PX and light sensors LS are arranged with a ratio of 1:1, by disposing one light sensor LS in one pixel PX. For relative comparison, assume that the accuracy of the fingerprint sensor 90 with a ratio of 1:1 is 500 ppi and the ratio of the area of the light sensor LS to the area of the pixel PX is 10%.

In the fingerprint sensor 92 according to a second aspect, pixels PX and light sensors LS are arranged with a ratio of 2:1, by disposing one light sensor LS in two pixels PX. The accuracy of the fingerprint sensor 92 is 354 ppi and the ratio of the area of the light sensor LS to the area of the pixel PX is reduced to 5%.

In the fingerprint sensor 94 according to a third aspect, pixels PX and light sensors LS are arranged with a ratio of 4:1, by disposing one light sensor LS in four pixels PX. The accuracy of the fingerprint sensor 94 is 250 ppi and the ratio of the area of the light sensor LS to the area of the pixel PX is reduced to 2.5%.

In the fingerprint sensor 96 according to a fourth aspect, pixels PX and light sensors LS are arranged with a ratio of 8:1, by disposing one light sensor LS in eight pixels PX. The accuracy of the fingerprint sensor 96 is 177 ppi and the ratio of the area of the light sensor LS to the area of the pixel PX is reduced to 1.25%.

In the fingerprint sensor 98 according to a fifth aspect, pixels PX and light sensors LS are arranged with a ratio of 9:1, by disposing one light sensor LS in nine pixels PX. The accuracy of the fingerprint sensor 98 is 167 ppi and the ratio of the area of the light sensor LS to the area of the pixel PX is reduced to 1.11%.

Figure 7A:
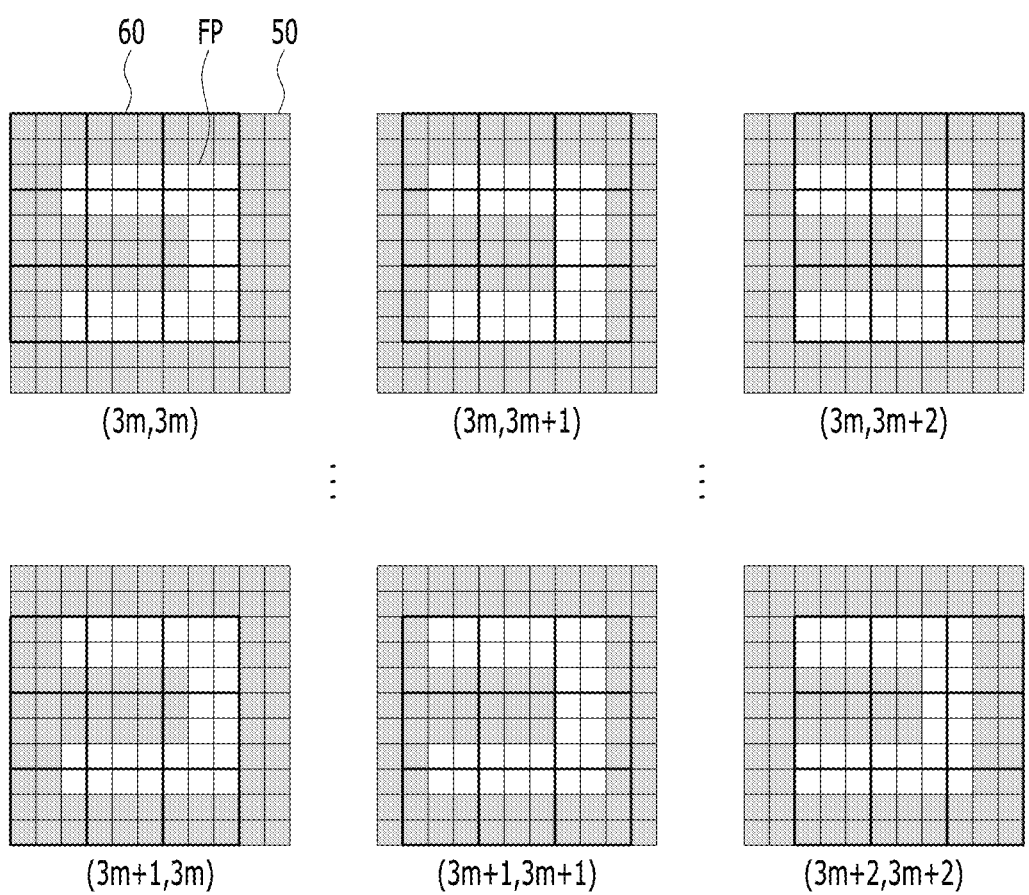
Figure 8:
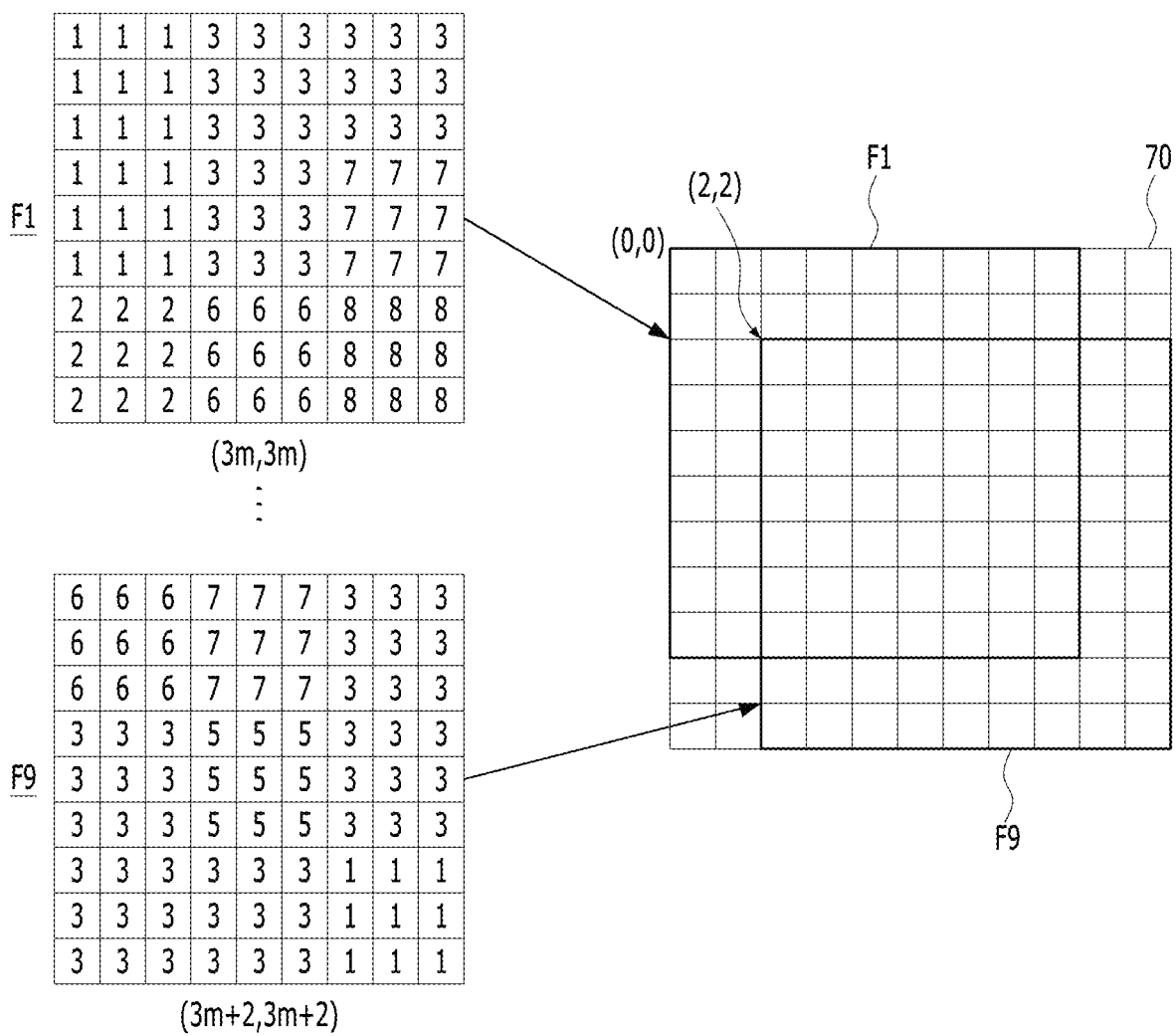
FIG. 8 shows a process of up-scaling and aligning fingerprint data of a plurality of frames according to an aspect of the present disclosure.
Figure 9:
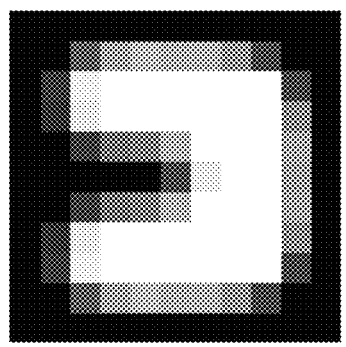
FIG. 9 shows a post-processing procedure of fingerprint recognition data according to an aspect of the present disclosure.
Figure 9:
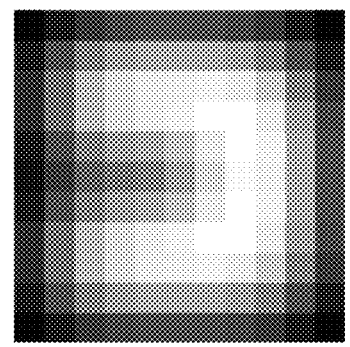

FIGS. 7A and 7B are views showing fingerprint data of a plurality of frames having different touch positions according to an aspect of the present disclosure, and FIGS. 8 and 9 are views showing a process of up-scaling and synthesizing the fingerprint data of the plurality of frames shown in FIG. 7 and fingerprint image post-processing.

Referring to FIG. 7A, assume that, when the ratio of the resolution of the touch sensor to the resolution of the fingerprint sensor is n:1, for example, 3:1, the touch coordinates are moved from (3m, 3m) (m being 0 or a positive integer) to (3m+2, 3m+2) according to the sliding operation of the finger on the surface 50 of the display. Referring to FIG. 7B, the fingerprint data F1 to F9 of the plurality of frames acquired from the result of sensing the fingerprint pattern FP by the light sensor array 60 having 3*3 resolution of the fingerprint sensor in frames having different touch coordinates is shown. The fingerprint data having 3*3 resolution acquired from the output of the light sensor array 60 having 3*3 resolution may be assumed as the fingerprint data of the fingerprint sensing area SA.

In FIG. 7A, it can be seen that the relative positions of the fingerprint pattern FP and the touch coordinates of the light sensor array 60 differ between frames, due to movement of the fingerprint pattern FP. As shown in FIG. 7B, the fingerprint data F1 to F9 of the plurality of frames acquired from the output of the light sensor array 60 having 3*3 resolution have different information. In other words, the fingerprint operation circuit 400 may acquire the data F1 to F9 of the plurality of frames having touch coordinates and sensing information which differ between frames, and store the data in the memory 600.

Referring to FIG. 8, the fingerprint operation circuit 400 up-scales the fingerprint data of the plurality of frames for each frame. For example, the fingerprint operation circuit 400 may simply enlarge the size of the fingerprint data Fi (i=1 to 9) of each frame by three times, thereby obtaining the fingerprint data of 9*9 resolution. The fingerprint operation circuit 400 aligns the up-scaled fingerprint data Fi in a predetermined synthesis area 70 using the touch coordinates of each frame. At this time, the fingerprint operation circuit 400 may determine a reference position aligned in the synthesis area 70 based on the touch coordinates of each frame.

For example, the fingerprint operation circuit 400 uses the remaining number excluding the quotient of the touch coordinates of each frame divided by n=3 which is the ratio of the resolution of the touch sensor to the resolution of the fingerprint sensor, as the reference position where the fingerprint data of each frame is aligned. It can be seen that, when the touch coordinates of the fingerprint data of the first frame are (3m, 3m) and the touch coordinates of the fingerprint data F9 of the ninth frame are (3m+2, 3m+2), the remaining numbers are (0, 0) and (2, 2). The fingerprint data F1 of the first frame may be aligned based on the first reference position (0, 0) in the synthesis area 70 and the fingerprint data F9 of the ninth frame may be aligned based on the ninth reference position (2, 2) in the synthesis area 70. The reference position used to align the fingerprint data of each frame may be determined according to the remaining number of the result of dividing the touch coordinates of each frame by the ratio of the resolution of the touch sensor and the resolution of the fingerprint sensor. The size 11*11 of the synthesis area 70 may be set to be greater than the size 9*9 of the fingerprint data of each frame up-scaled to include all the fingerprint data F1 to F9 of the plurality of frames having different reference positions.

Referring to FIG. 9, the fingerprint operation circuit 400 may acquire first fingerprint recognition data 80 of one frame, by averaging the fingerprint data F1 to F9 of the plurality of frames summed in the synthesis area 70 according to the position as shown in FIG. 8.

The fingerprint operation circuit 400 may acquire second fingerprint recognition data 82 with enhanced discrimination of data, by performing data stretching using a maximum value max and a minimum value min of the first fingerprint recognition data 80.

For example, the fingerprint operation circuit 400 may calculate stretched data Data' using a product of the difference data-min between the data Data and the minimum value min and a value (max_target/(max−min)) obtained by dividing a target maximum value (max_target) by a difference max-min between the maximum value max and the minimum value min of the data of the first fingerprint recognition data 80 as shown in Equation 1 below.

$$\text{Data}'=(\text{data}-\text{min})*(\text{max\_target}/(\text{max}-\text{min})) \quad \text{Equation 1}$$

The fingerprint operation circuit 400 may acquire the second fingerprint recognition data 82 of one frame with enhanced discrimination, through data stretching.

In addition, the fingerprint operation circuit 400 may acquire third fingerprint recognition data with improved sharpness, by applying a sharpness mask 52 to the second fingerprint recognition data 82 to perform the sharpness process or apply an S-shaped gamma curve to perform a contrast improvement process. Referring to FIG. 9, it can be seen that the sharpness of the fingerprint image 86 obtained by imaging the third fingerprint recognition data is improved as compared to the fingerprint image 84 obtained by imaging the second fingerprint recognition data 82.

FIGS. 10A to 10D are views showing a simulation result of a moving fingerprint recognition method using a display according to an aspect of the present disclosure.

Figure 10A:
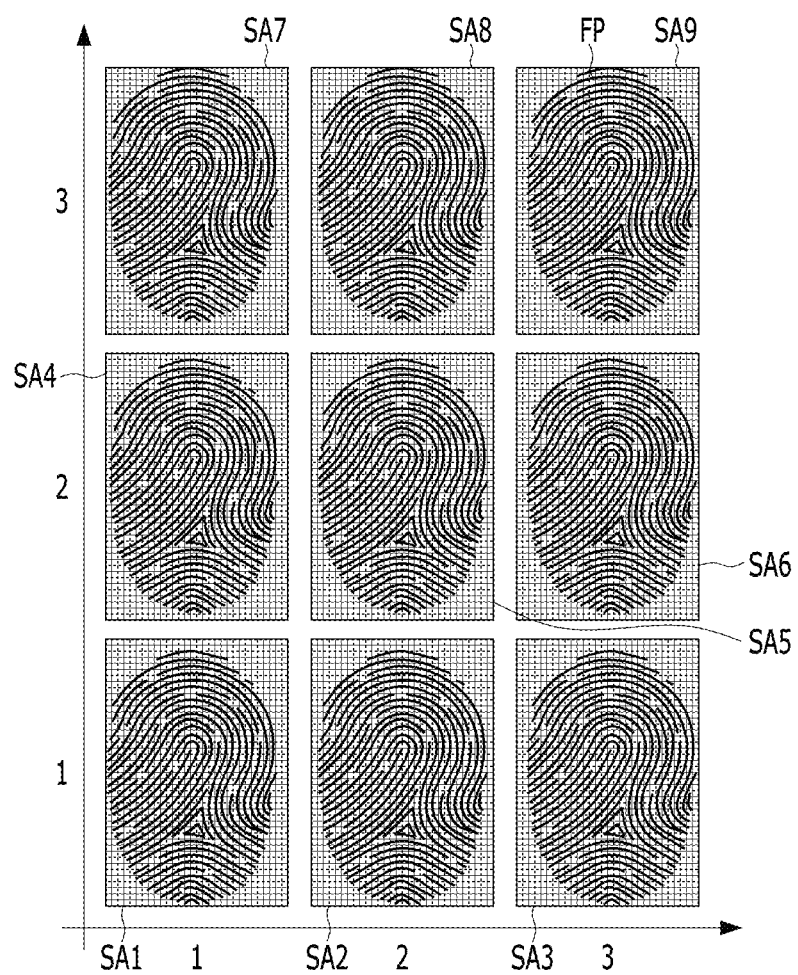
FIGS. 10A to 10D are views showing simulation results of a moving fingerprint recognition method using a display according to an aspect of the present disclosure.

Referring to FIGS. 10A and B, the fingerprint FP, the positions of which are moved according to the sliding operation of the finger, is sensed through the fingerprint sensor having low resolution in each of the first to ninth fingerprint sensing areas AS1 to SA9 having different touch coordinates, thereby acquiring the fingerprint data F1 to F9 of the first to ninth frames. Since the resolution of the fingerprint sensor is lower than that of the pixel, the fingerprint data of each frame cannot be identified.

Figure 10B:
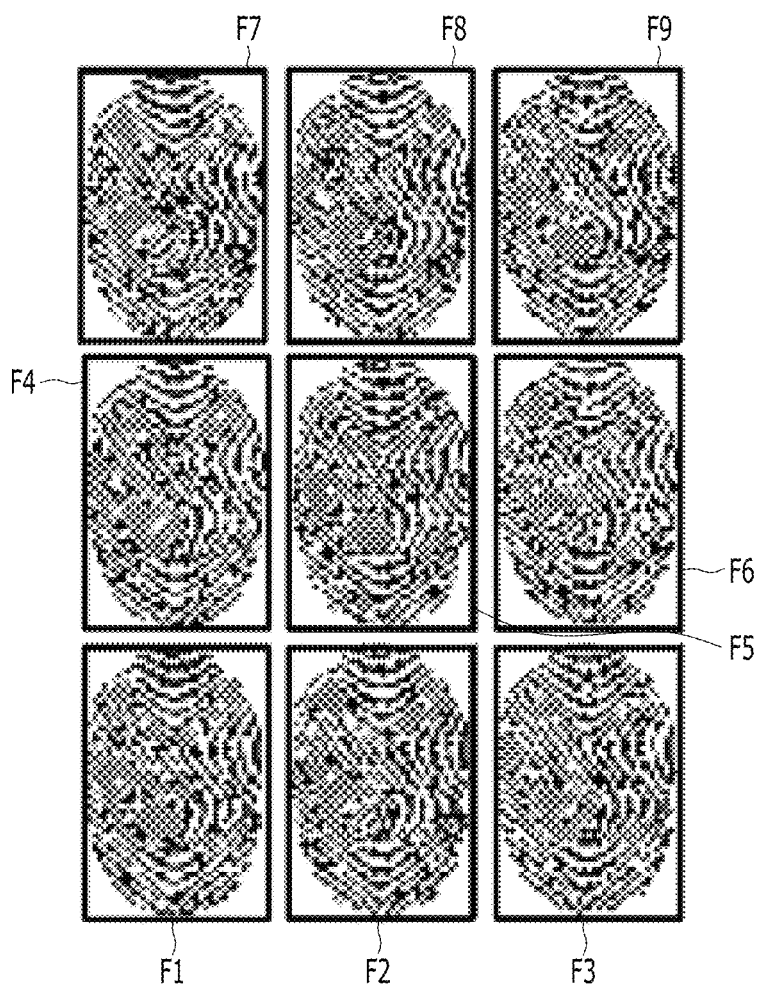
Figure 10C:

Referring to FIG. 10C, by up-scaling, aligning and summing the fingerprint data F1 to F9 of the first to ninth frames shown in FIG. 10B using the above-described moving fingerprint recognition technology, it is possible to acquire the first fingerprint recognition data 30 with improved resolution and accuracy.

Figure 10D:
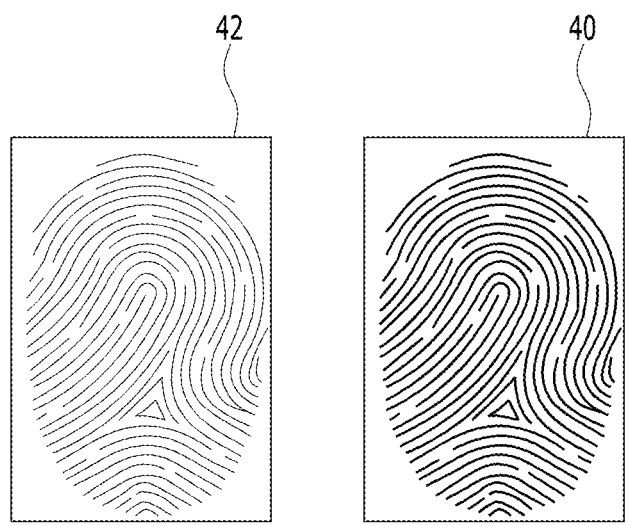

Referring to FIG. 10D, by further performing the sharpness process and the contrast improvement process with respect to the first fingerprint recognition data 30, the second fingerprint recognition data 40 with improved sharpness may be acquired and the acquired second fingerprint recognition data 40 can be identified similarly to the original fingerprint data 40.

As the simulation result of the fingerprint data F1 to F9 of nine frames shown in FIG. 10B, it is possible to improve accuracy of the fingerprint recognition data by about three times. Accordingly, when the fingerprint data of N frames are up-scaled and summed, it is possible to improve accuracy of the fingerprint recognition data by about times.

For example, if an average slide unlocking time is 0.2 seconds, since the fingerprint data of 12 frames may be obtained in the present disclosure, it is possible to improve accuracy of the fingerprint recognition data by about 3.5 times ($\sqrt{12}$). Accordingly, when accuracy of the fingerprint sensor is only 144 ppi, it is possible to acquire fingerprint recognition data with accuracy of 500 ppi or more. In other words, it is possible to reduce the accuracy of the fingerprint sensor to ⅓ to ¼ as compared to the accuracy of the fingerprint recognition data.

The fingerprint sensor capable of securing fingerprint recognition performance has accuracy of about 500 ppi.

For example, if a fingerprint sensor of about 500 ppi is built in a 6.1-inch display panel of a smartphone having pixel resolution of 3120*1440 and pixel accuracy of 564 ppi, since a light sensor area needs to be present in each pixel, it is inevitable that the aperture ratio of each pixel decreases and thus luminance decreases. However, by applying the moving fingerprint recognition apparatus and method according to the aspect, even if accuracy of the fingerprint sensor is reduced to be less than pixel accuracy, the fingerprint recognition data having high resolution can be acquired and fingerprint recognition performance can be secured. Therefore, it is possible to decrease the number of light sensors and to minimize decrease in pixel aperture ratio and decrease in luminance.

Meanwhile, when a fingerprint sensor is built in a 9.7-inch display panel of a tablet having pixel resolution of 2048*1536 and pixel accuracy of 264 ppi, even if a light sensor is provided in each pixel, it is impossible to achieve fingerprint recognition performance of 500 ppi. However, by applying the moving fingerprint recognition apparatus and method according to the aspect, even if the accuracy of the fingerprint sensor is low, it is possible to acquire the fingerprint recognition data with high resolution and to secure fingerprint recognition performance.

In one aspect of the present disclosure, since the fingerprint sensor is configured integrally with the pixel array of the display and the pixel array is used as a light source, a separate fingerprint sensor is not necessary, thereby reducing the size, thickness, weight and manufacturing cost of the display and the electronic apparatus using the same.

In one aspect of the present disclosure, by continuously sensing the fingerprint and the moving touch positions on the display surface and up-scaling, summing and synthesizing the sensed fingerprint data of the plurality of frames, it is possible to acquire fingerprint recognition data with high resolution and accuracy from the fingerprint data sensed with low resolution. Therefore, it is possible to improve fingerprint recognition performance.

In one aspect of the present disclosure, by further performing a sharpness process and a contrast improvement process of the fingerprint recognition data, it is possible to further increase discrimination of the fingerprint recognition data.

In one aspect of the present disclosure, since the fingerprint recognition data with high resolution and accuracy can be obtained from the fingerprint data sensed with low resolution, it is possible to reduce the accuracy of the fingerprint sensor built in the pixel array to be less than the resolution of the fingerprint recognition data.

In one aspect of the present disclosure, it is possible to reduce the manufacturing costs of the display and the electronic apparatus using the same. In addition, by reducing the area of the fingerprint sensor in the pixel array, it is possible to minimize decrease in the pixel aperture ratio and decrease in luminance. Therefore, it is possible to minimize display performance deterioration.

It will be apparent to those skilled in the art that various modifications and variations can be made in the present disclosure without departing from the spirit or scope of the disclosure. Therefore, the technical scope of the present disclosure should not be limited to the detailed description of the specification, but should be defined by the claims.

What is claimed is:

1. A moving fingerprint recognition apparatus comprising:
   a display including a pixel array, a touch sensor and a fingerprint sensor located in a display area;
   a display driver configured to drive the pixel array;
   a touch operation circuit configured to drive the touch sensor, to continuously sense touch positions of a finger touching that moves on a surface of the display through the touch sensor, to calculate touch coordinates of each frame of a plurality of frames from an output of the touch sensor during a time for the plurality of frames, and to store the touch coordinates in a memory;
   a fingerprint operation circuit configured to drive the fingerprint sensor, to continuously sense a fingerprint of the finger touching that moves on the surface of the display through the fingerprint sensor, to acquire fingerprint data of each frame of the plurality of frames from an output of the fingerprint sensor during the time for the plurality of frames, and to store the fingerprint data in the memory; and
   a controller configured to control operation of the display driver, the touch operation circuit, the fingerprint operation circuit and the memory,
   wherein the fingerprint operation circuit receives the touch coordinates and the fingerprint data of the plurality of frames from the memory and acquires fingerprint recognition data by synthesizing the fingerprint data of the plurality of frames through up-scaling, to enlarge a size of the fingerprint data of the plurality of frames, and summing.

2. The moving fingerprint recognition apparatus of claim 1, wherein the touch coordinates of each frame of the plurality of frames from the output of the touch sensor have different coordinate values, and
   wherein the fingerprint data of each frame of the plurality of frames from the output of the fingerprint sensor have different sensing information.

3. The moving fingerprint recognition apparatus of claim 1, wherein the fingerprint operation circuit receives the touch coordinates from the touch operation circuit for each frame of the plurality of frames, determines a fingerprint sensing area having a certain size based on the touch coordinates and including all of the fingerprint data of a reference value or more from the output of the fingerprint sensor for each frame of the plurality of frames, and extracts and stores the fingerprint data of the determined fingerprint sensing area in the memory.

4. The moving fingerprint recognition apparatus of claim 3, wherein the fingerprint operation circuit up-scales the fingerprint data of the plurality of frames for each frame to enlarge the size of the fingerprint data of the plurality of frames, aligns the up-scaled fingerprint data in a synthesis area using the touch coordinates of each frame of the plurality of frames, and acquires the fingerprint recognition data by summing and averaging the fingerprint data of the plurality of frames aligned in the synthesis area according to position.

5. The moving fingerprint recognition apparatus of claim 4, wherein the fingerprint operation circuit performs stretching operation with respect to the fingerprint recognition data to have a target range, and performs at least one of a sharpness process of applying a sharpness mask to the fingerprint recognition data subjected to stretching operation and a contrast improvement process of applying a gamma curve having a set shape.

6. The moving fingerprint recognition apparatus of claim 4, wherein the fingerprint operation circuit uses a remaining number of a result of dividing the touch coordinates of each frame of the plurality of frames by a ratio of resolution of the touch sensor to a resolution of the fingerprint sensor, as a reference position used to align the up-scaled fingerprint data in the synthesis area.

7. The moving fingerprint recognition apparatus of claim 4, wherein the fingerprint circuit performs stretching operation with respect to the fingerprint recognition data to have a target range, and performs at least one of a sharpness process of applying a sharpness mask to the fingerprint recognition data subjected to stretching operation and a contrast improvement process of applying a gamma curve having a set shape.

8. The moving fingerprint recognition apparatus of claim 1, wherein a resolution of the fingerprint data of each frame of the plurality of frames acquired from the fingerprint sensor is lower than resolution of the fingerprint recognition data.

9. The moving fingerprint recognition apparatus of claim 1, wherein the fingerprint sensor includes light sensors distributed in the pixel array to sense an amount of light emitted from the pixel array and reflected by the fingerprint.

10. The moving fingerprint recognition apparatus of claim 9, wherein each of the light sensors is disposed in each pixel or one of a plurality pixels.

11. The moving fingerprint recognition apparatus of claim 9, wherein each of the light sensors is disposed in every two pixels, every four pixels, every eight pixels or every nine pixels.

12. A moving fingerprint recognition method comprising:
   driving a pixel array, a touch sensor and a fingerprint sensor located in a display area of a display;
   continuously sensing touch positions of a finger touching and moving on a surface of the display through the touch sensor during a time for a plurality of frames, calculating touch coordinates of each frame from an output of the touch sensor corresponding to the plurality of frames, and storing the touch coordinates in a memory;
   continuously sensing a fingerprint of the touched and moved finger through the fingerprint sensor during the time for the plurality of frames, acquiring fingerprint data of each frame of the plurality of frames from an output of the fingerprint sensor during the time corresponding to the plurality of frames, and storing the fingerprint data in the memory; and receiving the touch coordinates and the fingerprint data of the plurality of frames from the memory, and acquiring fingerprint recognition data by up-scaling, to enlarge a size of the fingerprint data of the plurality of frames, summing and synthesizing the fingerprint data of the plurality of frames.

13. The moving fingerprint recognition method of claim 12, wherein the touch coordinates of each frame of the plurality of frames from the output of the touch sensor have different coordinate values, and
wherein the fingerprint data of each frame of the plurality of frames from the output of the fingerprint sensor have different sensing information.

14. The moving fingerprint recognition method of claim 12, wherein, when the fingerprint data of each frame of the plurality of frames is acquired, a fingerprint sensing area having a certain size based on the touch coordinates of each frame of the plurality of frames and including all fingerprint data of a reference value or more is determined from the output of the fingerprint sensor for each frame of the plurality of frames, and fingerprint data of the determined fingerprint sensing area is extracted.

15. The moving fingerprint recognition method of claim 14, wherein the acquiring of the fingerprint recognition data comprises:
up-scaling the fingerprint data of the plurality of frames for each frame to enlarge the size of the fingerprint data of the plurality of frames,
aligning the up-scaled fingerprint data in a synthesis area using the touch coordinates of each frame of the plurality of frames,
summing and averaging the fingerprint data of the plurality of frames aligned in the synthesis area according to position.

16. The moving fingerprint recognition method of claim 15, further comprising:
performing stretching operation with respect to the fingerprint recognition data to have a target range, and
performing at least one of a sharpness process of applying a sharpness mask to the fingerprint recognition data subjected to stretching operation and a contrast improvement process of applying a gamma curve having a set shape.

17. A moving fingerprint recognition apparatus comprising:
a pixel array including a plurality of pixels;
a touch sensor disposed on the pixel array and sensing a touch;
a fingerprint sensor including a plurality of light sensors distributed in between the plurality of pixels and sensing light emitted from the pixel array and reflected by a fingerprint;
a display driver configured to drive the pixel array;
a touch operation circuit configured to drive the touch sensor to continuously sense touch positions of a finger touching that moves through the touch sensor during a time for a plurality of frames, to calculate touch coordinates of each frame of the plurality of frames from an output of the touch sensor corresponding to the plurality of frames, and to store the touch coordinates in a memory;
a fingerprint operation circuit configured to drive the fingerprint sensor, to continuously sense a fingerprint of the finger touching that moves on a surface of a display through the fingerprint sensor during the time for the plurality of frames, to acquire fingerprint data of each frame of the plurality of frames from an output of the fingerprint sensor corresponding to the plurality of frames, and to store the fingerprint data in the memory; and
a controller configured to control operation of the display driver, the touch operation circuit, the fingerprint operation circuit and the memory,
wherein the fingerprint operation circuit receives the touch coordinates and the fingerprint data of the plurality of frames from the memory and acquires fingerprint recognition data by synthesizing the fingerprint data of the plurality of frames through up-scaling, to enlarge a size of the fingerprint data of the plurality of frames, and summing.

18. The moving fingerprint recognition apparatus of claim 17, wherein the touch coordinates of each frame of the plurality of frames from the output of the touch sensor have different coordinate values, and
wherein the fingerprint data of each frame of the plurality of frames from the output of the fingerprint sensor have different sensing information.

19. The moving fingerprint recognition apparatus of claim 17, wherein the fingerprint operation circuit receives touch coordinates from the touch operation circuit for each frame of the plurality of frames, determines a fingerprint sensing area having a certain size based on the touch coordinates and including all fingerprint data of a reference value or more from the output of the fingerprint sensor for each frame of the plurality of frames, and extracts and stores fingerprint data of the determined fingerprint sensing area in the memory.

20. The moving fingerprint recognition apparatus of claim 19, wherein the fingerprint operation circuit up-scales the fingerprint data of the plurality of frames for each frame from the output of the fingerprint sensor to enlarge the size of the fingerprint data of the plurality of frames, aligns the up-scaled data in a synthesis area using the touch coordinates of each frame of the plurality of frames, and acquires the fingerprint recognition data by summing and averaging the data of the plurality of frames aligned in the synthesis area according to position.

* * * * *